April 25, 1961  S. LIEBERMAN  2,980,920
BALL VALVE FOR FLUSH TANK
Filed April 22, 1960

INVENTOR.
SAMUEL LIEBERMAN
BY Morse + Altman
ATTORNEYS

United States Patent Office 2,980,920
Patented Apr. 25, 1961

2,980,920

BALL VALVE FOR FLUSH TANK

Samuel Lieberman, 42 Oak Hill St.,
Newton Center 69, Mass.

Filed Apr. 22, 1960, Ser. No. 24,097

1 Claim. (Cl. 4—56)

This invention relates to a ball valve such as is commonly used in the flush tanks of water closets. One form of such valve is a rubber ball which is linked to the lower end of a vertical rod depending from a lever within the flush tank. The ball engages in the end of a vertical pipe until raised by operation of the lever to let water escape into the pipe until the ball is lowered to engage again in the top of the pipe. In order to allow the ball to seat itself properly in the top of the pipe without requiring an accurate alignment of the rod with the axis of the pipe, the ball is linked to the end of the rod so that it can swing. An excessive freedom to swing is objectionable, however, as the ball may catch on the edge of the pipe when the rod descends instead of seating in the pipe. Various means have been devised to limit the rocking angle of the ball with reference to the axis of the rod. An improved means to that end is the subject of the present invention and is illustrated in the drawing, of which Figure 1 is a perspective view of a ball valve embodying the invention;

Figure 2:
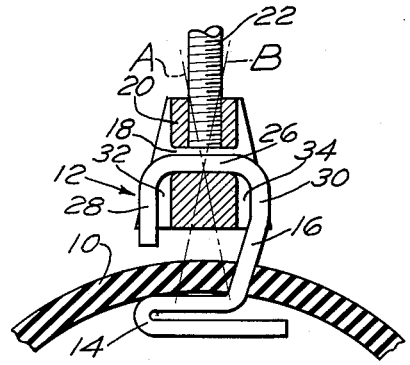
Figure 2 is a fragmentary sectional view, on an enlarged scale, of means connecting the ball and rod.

The hollow rubber ball 10 constituting the valve is provided with a link member 12 of bent wire, a portion 14 of which is reversely bent within the ball to act as an anchor. The exterior portion 16 is bent to U form and extends through a horizontal hole 18 in a conical block 20. This block is screw-threaded on the lower end of a stem or rod 22 in alignment therewith. The rod 22 is provided with an eye 24 at its upper end in the usual form. The U-shaped portion 16 of the link 12 has a horizontal part 26 which extends loosely through the hole 18, and depending parts 28 and 30 at the ends of the horizontal part. The parts 28 and 30 are disposed within vertical grooves 32 and 34 in the flanks of the conical block 20.

Figure 3:
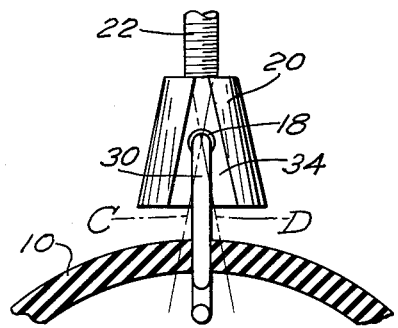
Figure 3 is an elevational view of the link, viewed from a different angle.
Figure 4:
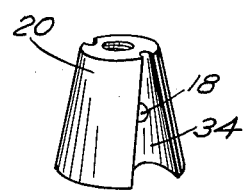
Figure 4 is a perspective view of the novel fitting which limits the movements of the link.
Figure 1:
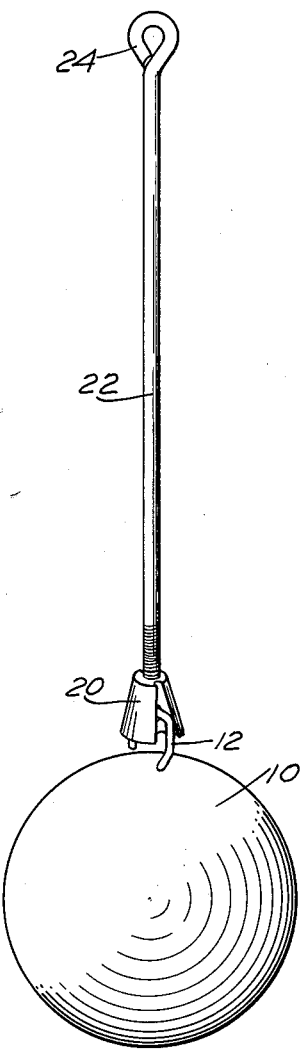

The loose fit of the horizontal part 26 of the link permits a limited rocking of the ball 10 in the plane of the paper as represented in Figure 2, the limiting angles of such rocking movement being indicated by the broken lines A, B. The depending parts 28 and 30 are disposed loosely within the grooves 32 and 34, permitting a limited rocking movement of the link and ball in the plane represented in Figure 3, the limiting angles being indicated by the broken lines C, D. By this simple and economical structure the ball is permitted a limited but sufficient rocking movement in any direction.

I claim:

In a ball valve for a flush tank, a hollow rubber ball, a stem screw-threaded at one end, a conical block threaded to said stem in axial alignment therewith, said block having two vertical grooves in its sides and a horizontal bore therethrough opening into said grooves, a portion of each groove below the opening of the bore therein being wider than the diameter of the bore, and a link member having an anchoring portion within the ball and a U-shaped exterior portion, said U-shaped portion comprising a horizontal part extending loosely through said bore and depending parts loosely disposed in said grooves respectively, whereby to limit in all directions the rocking movements of said ball relative to the axis of said stem.

References Cited in the file of this patent

UNITED STATES PATENTS

| | | |
|---|---|---|
| 1,712,605 | Delany | May 14, 1929 |
| 2,475,681 | Stentz | July 12, 1949 |
| 2,514,062 | Hoerig | July 4, 1950 |
| 2,716,242 | Robinson | Aug. 30, 1955 |
| 2,751,601 | Siber | June 26, 1956 |